310-13 SR SEARCH ROOM
FIP8502 XR 2,931,963

April 5, 1960 G. P. WILSON 2,931,963

LINEAR INDUCTION MOTOR SERVOSYSTEM FOR RECORDING OSCILLOGRAPH

Filed Feb. 4, 1957 3 Sheets-Sheet 1

INVENTOR.
GARDNER P. WILSON

BY
Christie, Parker & Hale
ATTORNEYS

LINEAR INDUCTION MOTOR SERVOSYSTEM FOR RECORDING OSCILLOGRAPH

Filed Feb. 4, 1957 3 Sheets-Sheet 2

INVENTOR.
GARDNER P. WILSON
BY
Christie, Parker & Hale
ATTORNEYS

LINEAR INDUCTION MOTOR SERVOSYSTEM FOR RECORDING OSCILLOGRAPH

Filed Feb. 4, 1957 3 Sheets-Sheet 3

INVENTOR.
GARDNER P. WILSON
BY Christie, Parker & Hale
ATTORNEYS

United States Patent Office 2,931,963

Patented Apr. 5, 1960

2,931,963

LINEAR INDUCTION MOTOR SERVOSYSTEM FOR RECORDING OSCILLOGRAPH

Gardner P. Wilson, Pasadena, Calif., assignor to Bell & Howell Company, Chicago, Ill., a corporation of Illinois Application February 4, 1957, Serial No. 638,006

6 Claims. (Cl. 318—22)

This invention relates to oscillograph recorders and, more particularly, is concerned with a linear type induction motor for controlling the recording stylus of an oscillograph.

In co-pending application, Serial No. 615,900, filed October 15, 1956, now Patent No. 2,889,503, in the name of Herbert I. Chambers, there is described a recording oscillograph using a closed loop servo arrangement for positioning the recording stylus. This recording oscillograph is capable of achieving much better frequency response than known closed loop type of servo-operated recording oscillographs in general use. This improved frequency response was achieved by means of a unique D.-C. motor in which the moving element consisted of a single conductive wire extending across a magnetic gap.

The present invention is an improvement on the recording oscillograph described in the above-mentioned co-pending application in that it provides an induction type linear motor for driving the moving element and the associated recording stylus in place of the D.-C. motor described in the co-pending application. The induction motor eliminates the need for sliding contacts to pass current through the moving element of the motor.

In brief, the present invention provides a recording oscillograph in which a linear induction motor of unique design drives the moving element thereof in a direction running parallel to the writing surface of the recording paper. The moving element, which functionally replaces the rotor of the more conventional A.-C. servo motor, is merely a flat sheet of conductive material, such as aluminum, which is caused to move back and forth on guide rails by the reactive force produced by eddy currents induced therein by a specially designed magnetic field structure. A writing stylus is attached to the moving element and used to write on a strip of paper across the surface thereof to record the movement of the moving element of the motor. Position-sensing means actuated by the moving element produces a position signal that is balanced against the input signal to the oscillograph. The resulting difference signal is used for controlling the positioning of the moving element.

For a better understanding of the invention, reference should be had to the accompanying drawings, wherein.

Figure 1:
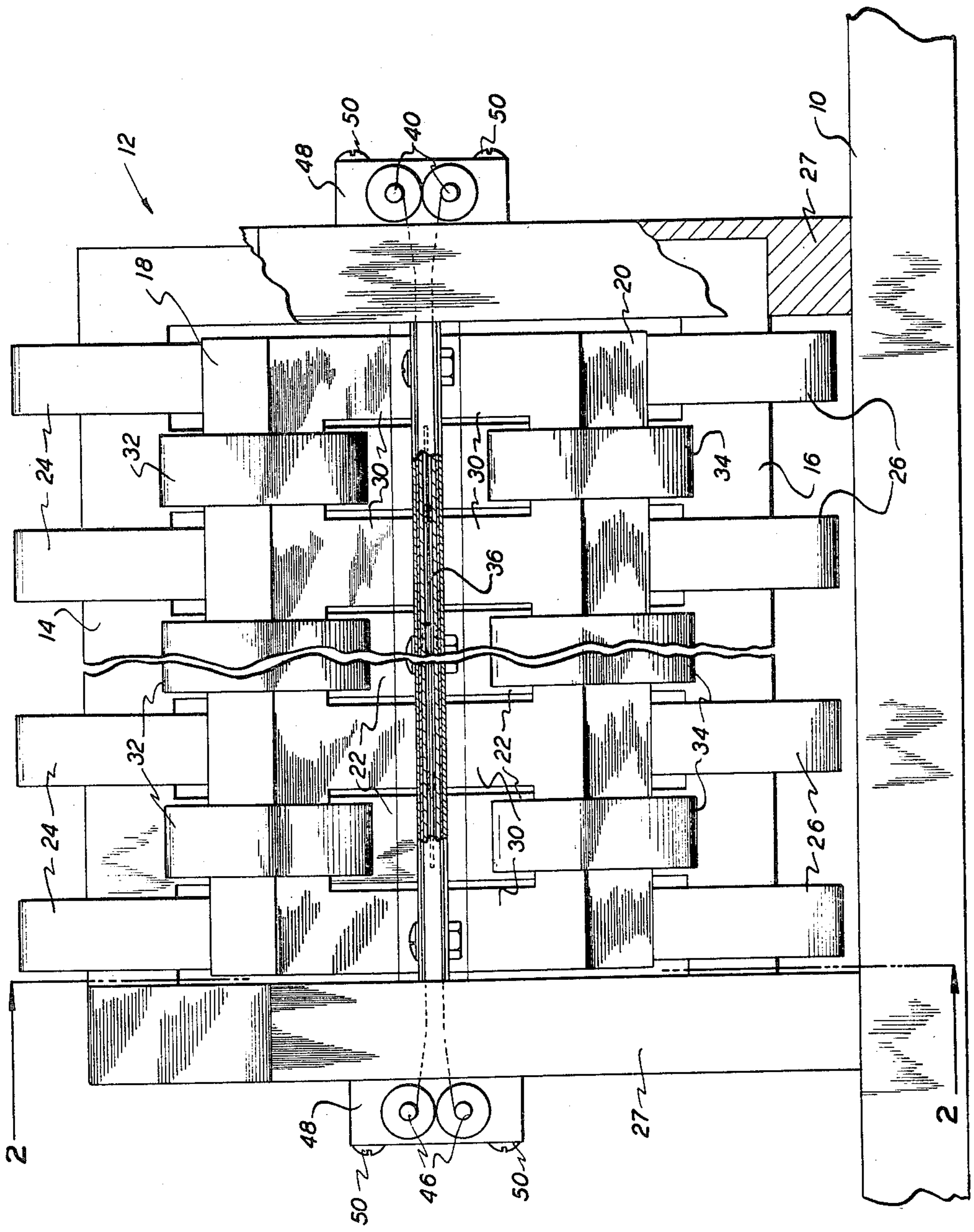
Fig. 1 is a front elevational view, partly in section, of the recorder.

Referring to the embodiment of the invention as illustrated in the drawings, the numeral 10 indicates generally the frame of the recorder on which is mounted an in-line type induction motor indicated generally at 12. The stator of the linear induction motor 12 is constructed of four core elements indicated generally at 14, 16, 18 and 20. Each of the cores is made up of laminations of magnet steel in the manner of conventional stator design to reduce eddy current losses in the stator core.

Each of the core laminations of the opposing core elements 14 and 16, is made in a comb shape, i.e., they each comprise a plurality of projecting fingers, such as indicated at 22, which form magnetic poles. Coils, such as indicated at 24 and 26 are wound on the respective cores 14 and 16, the coils associated with any one core being connected in series such that the current passed through the coils induces flux polarized in such a way that successive poles formed by the core are of opposite magnetic polarity. In other words, a current passed through the coils on one core produces north and south poles alternately in the core fingers 22.

The cores 14 and 16 are supported by the frame 10 by means of suitable brackets at the end of the core, such as indicated at 27. The cores 14 and 16 are positioned with their projecting fingers extending toward each other and in line in the manner shown in Fig. 1. Thus, a magnetic gap is formed between pairs of opposite fingers of the cores 14 and 16. The coils 26 mounted on the core 16 are connected in series with each other and in series with the coils 24 mounted on the core 14. Thus, the projecting fingers of the core 16 form poles of opposite magnetic polarity from the corresponding poles formed by the projecting fingers of the core 14. In this manner flux is produced across the successive gaps formed between the projecting fingers of the two cores 14 and 16, the flux for a given direction of current flow in the coils 24 and 26 being polarized in opposite directions in adjacent gaps.

Figure 2:
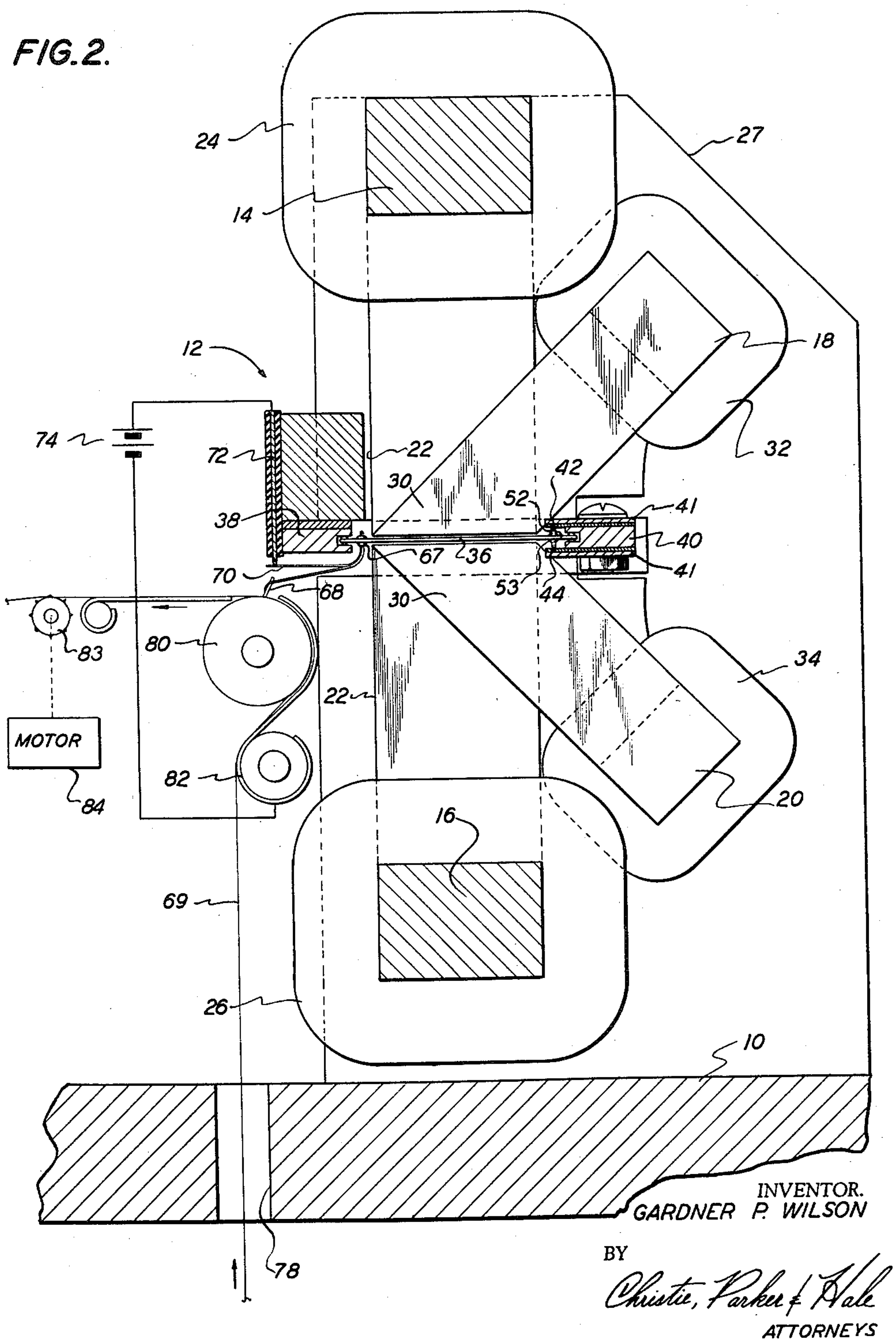
Fig. 2 is a sectional view taken on the line 2—2 of Fig. 1.

Similarly, the cores 18 and 20 are formed with a plurality of projecting fingers 30 having the same spacing as the fingers 22 of the cores 14 and 16 and of such size that they can be inserted between the fingers of the cores 14 and 16 in interdigital fashion. The cores 18 and 20 are supported from the frame 10 by the brackets 27. In order that the cores 18 and 20 may be positioned to form magnetic gaps between the gaps formed by the projecting fingers 22 of the cores 14 and 16, the cores 18 and 20 are mounted at an angle with respect to each other and with respect to the cores 14 and 16, whereby the stator of the motor has a substantially K-configuration, as best shown in Fig. 2. The opposing fingers 30 of the cores 18 and 20 are beveled at their ends to form parallel gaps therebetween which are in the same plane with the gaps formed by the projecting fingers 22 of the cores 14 and 16.

A plurality of coils 32 are wound on the core 18 at positions intermediate the projecting fingers 30 thereof. Similarly, a plurality of coils 34 are wound on the core 20 at positions intermediate the projecting fingers 30 thereof. The coils 32 and 34 are connected in series such that a current passing therethrough produces flux across the gaps formed by the projecting fingers 30 of the cores 18 and 20, the direction of the flux being polarized in opposite directions in adjacent gaps formed by the cores 18 and 20.

Figure 3:
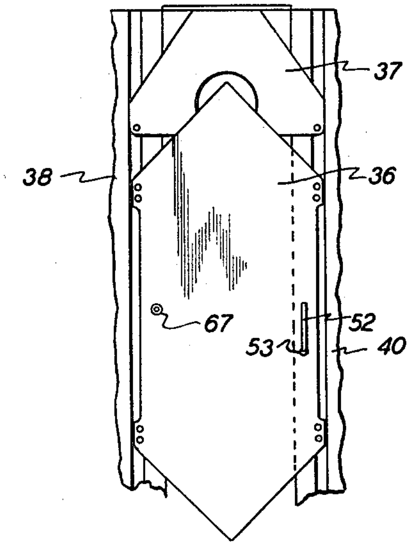
Fig. 3 is a fragmentary view showing the moving element of the linear induction motor used in the oscillograph.

The moving element which functionally comprises the rotor of the linear induction motor 12 is a thin sheet of conductive material 36. The shape of the moving element 36, as seen in Fig. 3, is elongated with tapered ends and of width slightly larger than the thickness of the cores at the gaps. The length of the moving element 36 is sufficient to extend through adjacent gaps formed by one set of cores, such as 14 and 16. The moving element 36 is slidably positioned for movement between the gaps formed by the rotor element by means of a pair of tracks or guides 38 and 40 supported by the brackets 27 and extending respectively along the extent of the cores adjacent the magnetic gaps. The tracks 38 and 40 support the rotor element 36 for longitudinal movement between the magnetic gaps of the stator structure.

Operation of the induction motor as thus far described can best be understood by considering the motor as analogous to a two-phase eddy current type of servo motor, known as a drag-cup motor, but with the stator structure in a straight line instead of in a closed circle. Thus, if a first alternating current is applied to the coils 24 and 26 connected in series, and a second alternating current, shifted in phase by 90° from the current applied to the coils 24 and 26, is connected to the coils 32 and 34 in series, a travelling magnetic wave is in effect propagated down the magnetic structure of the stator. The speed of propagation of this travelling magnetic wave is a function of the spacing between adjacent sets of poles and the frequency of the alternating signal. The sense or direction of this travelling wave depends upon whether the phase of the signal applied to the coils 32 and 34 leads or lags by 90° the signal applied to the coils 24 and 26. Thus, the rotating vector of the conventional two-phase induction motor becomes a travelling linear vector in the stator configuration of the present linear induction motor.

This being the case, when the moving element 36 is positioned in the gap, eddy currents are induced therein which produce a reactive magnetic field. As a result, the moving element is dragged along by the linear travelling magnetic field produced by the stator in exactly the same manner as the conductive rotor is rotated by a rotating magnetic field in the well-known drag-cup type of two-phase servo motor. Movement of the element 36 is limited by suitable stops, such as indicated at 37 in Fig. 3.

Since the strength of the field produced by the stator varies due to the salient pole construction, the force produced on the moving element 36 is not uniform throughout its length of travel. The result is a "cogging" effect. The tapered ends of the moving element 36 act to minimize this cogging effect produced as the moving element passes the stator poles. By use of these tapers, the induced eddy currents can be prolonged and caused to change gradually with the position, thereby smoothing the action of the moving element 36.

In order to utilize the linear induction motor above described as part of the recording oscillograph, a pair of resistance wires 42 and 44 are held in spaced parallel relation by plates 41 secured to the track 40. The wires are insulated from the plates 41 by thin layers of insulating material. These resistance wires are supported at their ends by screws, such as indicated at 46, which are secured in position by blocks 48 of insulating material supported from the end brackets 27 by means of screws 50. The two resistance wires are contacted by a pair of spring fingers 52 secured to the moving element 36 by an insulating grommet 53. The spring fingers 52 function to provide a short-circuit at the point of contact between the two resistance wires. The resistance wires in combination with the short-circuiting contact fingers 52 serve as a potentiometric sensing means which is utilized in the control circuit, as hereinafter described in connection with Fig. 4, to sense the position of the element 36.

Figure 4:
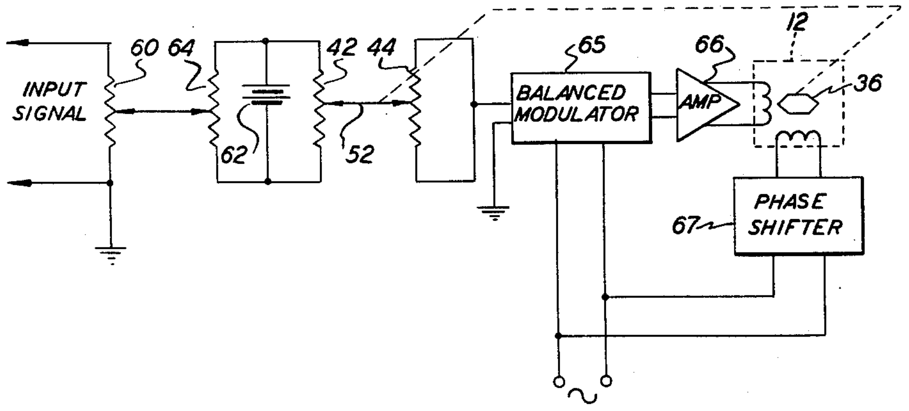
Fig. 4 is a schematic diagram of the electrical circuit used in controlling the oscillograph.

Referring to Fig. 4 in detail, the input signal to be measured is applied across a potentiometer-type attenuator 60 from which an attenuated version of the input signal is derived. The input voltage from the attenuator 60 is balanced against a voltage derived from the slide wires in the following manner. The slide wire 42 is connected across a potential source 62 whereby a voltage is produced at the contact fingers 52 which is proportional to the position of the contact fingers 52 (and hence the position of the moving element 36 along the extent of the slide wire). Zero setting is provided by a second potentiometer 64 connected across the potential source 62, the sliding contact of which is directly connected to the input signal derived from the sliding contact of the attenuator 60. By means of the zero setting potentiometer 64, it will be seen that the point along the slide wire 42 at which a zero voltage is provided at the sliding contact fingers 52 with reference to the sliding contact of attenuator 60 may be adjusted.

If the voltage between the sliding contact of the potentiometer 64 and the sliding contact fingers 52 along the slide wire 42 is different than the voltage derived at the sliding contact to the input attenuator 60, a net voltage with respect to ground is applied to the input of a balanced modulator 65. The balanced modulator is of conventional design, such as a diode ring modulator or a synchronous chopper, to which is coupled an alternating current reference signal from a suitable 60-cycle source (not shown).

It will be noted that the contact finger 52 along the slide wire 42 is connected to the input of the modulator 65 through the second slide wire 44. The purpose of the second slide wire is to provide means for cancelling out noise which is generated by the contact potential between the slide wires and the contact fingers 52. The noise produced by contact potential is known as the Tribo noise effect. The double potentiometer technique of cancelling out noise due to the Tribo effect is a well known technique.

The output of the modulator 65 is connected through an A.-C. amplifier 66 to one set of windings of the stator of the linear induction motor 12. By virtue of the balanced modulator 65, as the polarity and magnitude of the voltage developed at the sliding contact fingers 52 varies due to changes in the input signal or changes in the position of the moving element 36, the amplitude and phase of the signal applied to the motor from the output of the amplifier 66 is varied accordingly. A reference A.-C. 60-cycle signal is applied to the other set of windings of the stator through a phase-shift network 67 by means of which the phase of the voltage can be adjusted to be exactly 90°, i.e., in phase quadrature, with respect to the signal derived from the amplifier 66. The output of the amplifier 66 either leads or lags by 90° the reference voltage applied to the other set of windings of the stator depending upon the polarity of the control signal applied to the balanced modulator 65.

The circuit of Fig. 4 is arranged so that the output from the amplifier 66 is the proper phase to cause the element 36 of the induction motor to move in a direction which tends to reduce to zero the difference signal appearing at the input of the balanced modulator 65. As the magnitude of the input signal applied to the input attenuator 60 changes, a net signal results at the input to the modulator 65 causing acceleration of the moving element 36 of the motor. This causes the shorting contact fingers 52 to move along the slide wire 42 to a position where the net signal applied to the balanced modulator 65 is restored to zero, at which time the moving element 36 comes to rest. It will be seen that the position of the moving element 36 is thus made proportional to the magnitude of the input signal applied to the attenuator 60.

In order to record the excursions of the moving element 36 in response to variations in the input signal applied to the attenuator 60, the moving element is provided with a tracing member or stylus 68 supported by an insulating grommet 67. The stylus 68 rides against a sheet of special sensitized recording material 69, preferably of a type sensitive to an electric current, reeled off of a supply roll (not shown). The recording material 69 is brought up through a slot 78 in the frame 10 and over a rotating mandril 80. Before passing over the mandril 80, the recording material 69 has its sensitive surface passing over a wiper contact, such as indicated at 82. A spring contact 70 supported from the stylus element 68 rubs against the edge of a conductive plate 72 insulatedly supported from the end brackets 27 along the extent of travel of the stylus 68. A battery 74 is connected between the plate 72 and contact finger 82 to produce a potential between the recording material 69 and stylus 68. Thus, a rather large voltage drop is experienced at the point where the stylus 68 contacts the electro-sensitive surface of the paper (since the stylus 68 is substantially at ground potential). As a result, a trace is produced on the sensitive surface of the recording material by the stylus 68 as it is moved with the moving member 36 of the recording motor.

The recording strip is moved by a rotating mandril 83 driven by suitable motor means, such as indicated at 84. The mandril 83 is provided preferably with sprocket teeth which engage the recording material along the edges thereof to provide positive drive engagement between the mandril 83 and the recording material 69. The motor means may include a gear box for setting different speeds of the recording strip.

From the above description it will be recognized that an improved recording oscillograph is provided of the closed loop follow-up servo type. The linear induction motor with its thin, light conductive moving element has very low inertia. By virtue of the fact that the motor operates by induction effects, the use of sliding contacts for passing large currents through the moving element is avoided. Any friction normally opposing the moving element is also thereby reduced. The magnet structure for the stator can be made much lighter and more compact than the large permanent magnet field structure heretofore required in the D.-C. type of linear motor described in the above-identified co-pending application.

What is claimed is:

1. An oscillograph for indicating variations in the magnitude of an input signal with time comprising a linear induction motor including a pair of magnetic field structures having a plurality of interdigital pole pairs defining a plurality of gaps in a line and lying in a common plane, means for applying an alternating magnetic field across the gaps between the pole pairs of one of the field structures, means for applying an alternating magnetic field across the gaps between the pole pairs of the other of the field structures, and a non-magnetic conductive element supported for movement in the plane of the gaps along said line, the respective alternating fields associated with the pair of field structures being in time quadrature with respect to each other; sensing means for deriving a signal whose magnitude is indicative of the position of the movable element of the linear induction motor; and means responsive to the instantaneous difference in magnitude of the signal derived from the sensing means and the input signal for varying the magnitude and phase of one of said alternating fields, whereby the position of the movable element of the linear induction motor is a measure of the instantaneous value of the input signal.

2. Apparatus as defined in claim 1 wherein said sensing means includes a resistive wire extending along the path of the moving element of the motor, and contact means carried by the moving element and slidably engaging the wire, whereby a potential can be established at the contact proportional to the position of the contact along the wire.

3. A linear induction motor for a recording oscillograph comprising a stator including a first core structure having a plurality of opposed spaced fingers with gaps between the ends of the opposing pairs of fingers located in a common plane, a plurality of coils wound on the first core structure in the regions between adjacent fingers, a second core structure having a plurality of opposed spaced fingers with gaps between the ends of the opposing pairs of fingers, the fingers of the second core structure being interdigitated with the fingers of the first core structure with the gaps being in the same common plane, and a plurality of coils wound on the second core structure in the regions between adjacent fingers; a non-magnetic thin conductive element positioned in the plane of the gaps between the opposed pairs of fingers of the core structures, the conductive element being of sufficient length to extend through the gaps of adjacent pairs of opposed fingers in one of the core structures and further being tapered at the ends thereof; means supporting the conductive element for movement through the gaps; means for passing a first alternating current serially through the coils on the first core structure; and means for passing a second alternating current serially through the coils on the second core structure, the first current and second current being in phase quadrature.

4. A linear induction motor for a recording oscillograph comprising a stator including a first core structure having a plurality of opposed spaced fingers with gaps between the ends of the opposing pairs of fingers located in a common plane, a plurality of coils wound on the first core structure, a second core structure having a plurality of opposed spaced fingers with gaps between the ends of the opposing pairs of fingers, the fingers of the second core structure being intedigitated with the fingers of the first core structure with the gaps being in the same common plane, and a plurality of coils wound on the second core structure; a non-magnetic thin conductive element positioned in the plane of the gaps between the opposed pairs of fingers of the core structures; means supporting the conductive element for movement through the gaps; means for passing a first alternating current serially through the coils on the first core structure; and means for passing a second alternating current serially through the coils on the second core structure, the first current and second current being in phase quadrature.

5. A recording oscillograph comprising a linear induction motor including a first core structure having a plurality of opposed spaced fingers with gaps between the ends of the opposing pairs of fingers located in a common plane, a plurality of coils wound on the first core structure, a second core structure having a plurality of opposed spaced fingers with gaps between the ends of the opposing pairs of fingers, the fingers of the second core structure being interdigitated with the fingers of the first core structure with the gaps being in the same common plane, and a plurality of coils wound on the second core structure; a non-magnetic thin conductive element positioned in the plane of the gaps between the opposed pairs of fingers of the core structures; means supporting the conductive element for movement through the gaps; means for passing a first alternating current serially through the coils on the first core structure; sensing means for producing a signal indicative of the position of the conductive element of the linear induction motor; and means for passing a second current through the coils on the second core structure in phase quadrature with the first current in response to the difference in potential of an input signal and the signal derived from the sensing means.

6. A linear induction motor including a pair of magnetic field structures having a plurality of interdigital pole pairs defining a plurality of gaps in a line and lying in a common plane, means for applying an alternating magnetic field across the gaps between the pole pairs of one of the field structures, means for applying an alternating magnetic field across the gaps between the pole pairs of the other of the field structures, and a non-magnetic conductive element supported for movement in the plane of the gaps along said line, the respective alternating fields associated with the pair of field structures being in time quadrature with respect to each other.

References Cited in the file of this patent

UNITED STATES PATENTS

| | | |
|---|---|---|
| 448,598 | Wheeler et al. | Mar. 17, 1891 |
| 2,112,264 | Bowles et al. | Mar. 29, 1938 |
| 2,581,133 | Niemann | Jan. 1, 1952 |
| 2,606,092 | Rich | Aug. 5, 1952 |
| 2,677,095 | Maltby et al. | Apr. 27, 1954 |